United States Patent
Jamali et al.

(10) Patent No.: US 12,242,159 B2
(45) Date of Patent: Mar. 4, 2025

(54) OPTICAL DEVICES WITH ACTIVE COMPONENTS COUPLED WITH PASSIVE COMPONENTS

(71) Applicant: Meta Platforms Technologies, LLC, Menlo Park, CA (US)

(72) Inventors: Afsoon Jamali, Issaquah, WA (US); Chih-Lan Chuang, Seattle, WA (US)

(73) Assignee: Meta Platforms Technologies, LLC

( * ) Notice: Subject to any disclaimer, the term of this patent is extended or adjusted under 35 U.S.C. 154(b) by 0 days.

(21) Appl. No.: 18/358,932

(22) Filed: Jul. 25, 2023

(65) Prior Publication Data
US 2024/0027850 A1    Jan. 25, 2024

Related U.S. Application Data

(60) Provisional application No. 63/407,063, filed on Sep. 15, 2022, provisional application No. 63/392,102, filed on Jul. 25, 2022.

(51) Int. Cl.
    *G02F 1/1343*    (2006.01)
(52) U.S. Cl.
    CPC ................ *G02F 1/13439* (2013.01)

(58) Field of Classification Search
None
See application file for complete search history.

(56) References Cited

U.S. PATENT DOCUMENTS

| | | | |
|---|---|---|---|
| 2006/0043374 A1* | 3/2006 | Horikawa | G06F 3/045 438/149 |
| 2017/0122028 A1* | 5/2017 | Suzuka | E06B 3/67 |
| 2017/0160574 A1* | 6/2017 | Yamaguchi | G02F 1/13338 |
| 2017/0235165 A1* | 8/2017 | Yamada | G02F 1/1525 349/33 |
| 2020/0176478 A1* | 6/2020 | Wu | G06F 3/0446 |
| 2020/0195225 A1* | 6/2020 | Sakai | H03H 9/02094 |
| 2021/0200041 A1* | 7/2021 | Keicho | G02F 1/137 |
| 2021/0208437 A1* | 7/2021 | Ohkubo | G02F 1/137 |

\* cited by examiner

*Primary Examiner* — Ryan Crockett
(74) *Attorney, Agent, or Firm* — Morgan, Lewis & Bockius LLP (57) ABSTRACT

An optical assembly includes an active optical component. The active optical component includes an activation layer located between two electrodes, such as a first electrode and a second electrode distinct and separate from the first electrode. The active optical component also includes one or more substrates for providing mechanical support for at least one of the two electrodes. In some configurations, the optical assembly includes a first substrate for providing mechanical support for the first electrode, and a second substrate for providing mechanical support for the second electrode.

17 Claims, 7 Drawing Sheets

OPTICAL DEVICES WITH ACTIVE COMPONENTS COUPLED WITH PASSIVE COMPONENTS

RELATED APPLICATIONS

This application claims the benefit of, and priority to, U.S. Provisional Patent Application Ser. No. 63/392,102, filed Jul. 25, 2022, and U.S. Provisional Patent Application Ser. No. 63/407,063, filed Sep. 15, 2022, both of which are incorporated by reference herein in their entireties.

TECHNICAL FIELD

The present disclosure relates generally to optical devices and, more specifically, to optical devices with active components coupled to passive components.

BACKGROUND

Optical devices may employ various optical components to provide particular operations. Such optical components often include passive components, such as static lenses and static filters that have operational characteristics that do not change significantly over time. For example, a static lens may have a particular optical power that does not change significantly over time. Optical components may also include active components that change their operational characteristics based on control parameters. Examples of active components include light sources, detectors, switchable mirrors, variable optical attenuators, and tunable optical filters. Control parameters may be electrical signals, exposure to heat, exposure to particular light (e.g., ultraviolet light) applied to such active components. By combining passive optical components and active optical components, optical devices may perform advanced operations.

SUMMARY

Certain optical devices include an electroactive component and a passive component. In some configurations, the electroactive component and the passive component are produced separately and subsequently combined (e.g., laminated) together. Electroactive components typically include electrodes for receiving electrical signals and/or distributing such electrical signals to electro-optic material. In certain electroactive components, such electrodes are thin layers of conductive material. The thickness of such conductive material may be small. Thin layers of conductive material typically have low stiffness and may get damaged or bent during combination of the electro active component and the passive component.

In addition, even for devices that include an electroactive component and a passive component without physically combining the electroactive component and the passive component (e.g., without laminating the two components together), or for devices that do not include passive components, electrically coupling electrodes of the electroactive component to control lines is required, which may also damage or bend the electrodes.

Thus, there is a need for devices that can maintain structural integrity of electrodes.

Devices described herein include one or more substrates for providing mechanical support for electrodes.

In accordance with some embodiments, an optical assembly includes an active optical component that includes an activation layer located between two electrodes, and one or more substrates for providing mechanical support for at least one of the two electrodes.

In accordance with some embodiments, a method for making an optical assembly includes coupling an active optical component that includes an active optical component that includes an activation layer located between two electrodes, and one or more substrates for providing mechanical support for at least one of the two electrodes with a passive optical component.

The devices and methods described herein may replace existing devices and methods. Alternatively, the devices and methods described herein may complement existing devices and methods.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

These figures are not drawn to scale unless indicated otherwise.

DETAILED DESCRIPTION

Electro-optic devices are widely used in optical applications. By providing the ability to modulate light based on applied electrical signals, electro-optic devices can be used, for example, to switch on or off light. Additionally or alternatively, electro-optic devices can be used to modify optical properties of light, such as polarization or spectral power distribution.

Embodiments consistent with the present disclosure will be described with reference to the accompanying drawings, which are merely examples for illustrative purposes and are not intended to limit the scope. Wherever possible, the same reference numbers are used throughout the drawings to refer to the same or similar parts, and a detailed description thereof may be omitted.

Further, in the present disclosure, the disclosed embodiments and the features of the disclosed embodiments may be combined. The described embodiments are some but not all of the embodiments. Based on the disclosed embodiments, persons of ordinary skill in the art may derive other embodiments consistent with the present disclosure. For example, modifications, adaptations, substitutions, additions, or other variations may be made based on the disclosed embodiments. Such variations of the disclosed embodiments are still within the scope. Accordingly, the present disclosure is not limited to the disclosed embodiments. Instead, the scope is defined by the appended claims.

Figure 1:
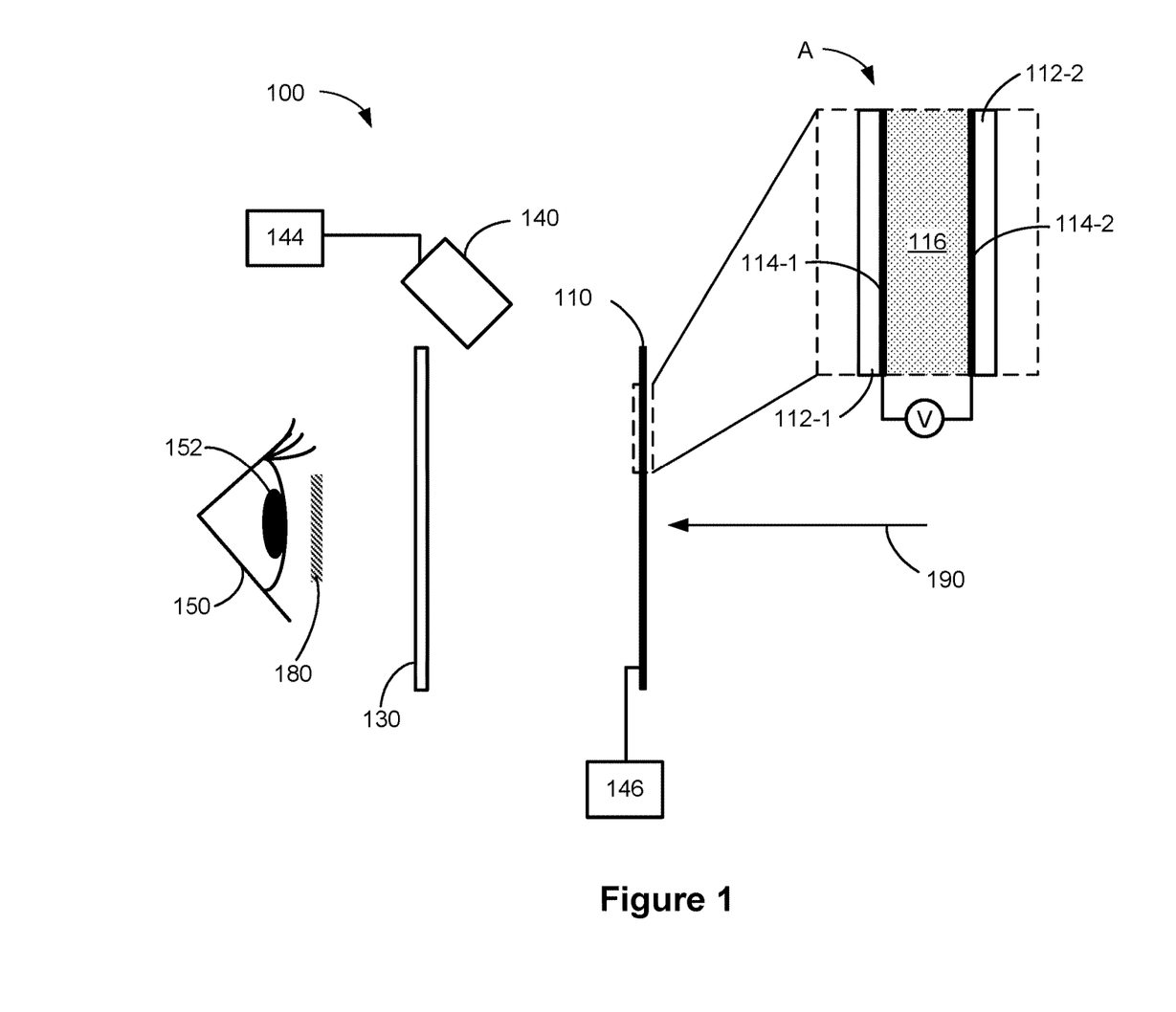
FIG. 1 is a schematic diagram illustrating a display device that includes an electro-optic device in accordance with some embodiments.

FIG. 1 is a schematic diagram illustrating a display device 100 that includes an electro-optic device 110 in accordance with some embodiments. As shown, electro-optic device 110 is coupled to a controller 146. Display device 100 also includes an optical assembly 130. In some embodiments, the optical assembly 130 includes one or more lenses. In some embodiments, the optical assembly 130 includes one or more prisms or other optical components. In some embodiments, display device 100 may also include one or more image sources 140 (e.g., a projector) that are coupled to a controller 144.

Inset A illustrates details of electro-optic device 110 in accordance with some embodiments. As shown, electro-optic device 110 includes a first substrate 112-1, a second substrate 112-2 that is distinct and separate from (e.g., opposite to) the first substrate 112-1, and optical medium 116 that is disposed between the first substrate 112-1 and the second substrate 112-2.

In some embodiments, as shown, the electro-optic device 110 also includes a first electrode 114-1 that is coupled to (e.g., coated on) the first substrate 112-1 and a second electrode 114-2 that is coupled to (e.g., coated on) the second substrate 110-2. In such cases, the first electrode and the second electrode are operatively (e.g., electrically) coupled to a voltage source V. In some embodiments, voltage source V is electrically connected to controller 146. By changing the voltage of voltage source V, the optical properties of the optical medium 116 can be changed. For example, in some embodiments, the optical medium 116 includes optically anisotropic molecules (e.g., liquid crystals). In some configurations, by changing the voltage of voltage source V, the optically anisotropic molecules (and thereby, the electro-optic device 110) can be configured to either (1) diffuse incident light or (2) transmit incident light without diffusing the incident light. In some other configurations, by changing the voltage of voltage source V, the optically anisotropic molecules (and thereby, the electro-optic device 110) can be configured to either (1) transmit incident light without changing the polarization of the transmitted light or (2) change the polarization of transmitted light.

In some embodiments, the first electrode 114-1 is located on a surface of the first substrate 112-1 facing the optical medium 116. In some embodiments, the first electrode 114-1 is located on a surface of the first substrate 112-1 away from the optical medium 116. In some embodiments, the second electrode 114-2 is located on a surface of the second substrate 112-2 facing the optical medium 116. In some embodiments, the second electrode 114-2 is located on a surface of the second substrate 112-2 away from the optical medium 116.

In some embodiments, the electro-optic device 110 is configurable to block or to allow transmission of ambient light 190 originating from outside the housing, such as light from the environment outside display device 100. As shown, under certain conditions (e.g., when the electro-optic device 110 is in a state allowing transmission of light), ambient light 190 is transmitted through the electro-optic device 110 and optical assembly 130 before reaching eyebox 180. The light reaching eyebox 180 may enter the pupil 152 of eye 150. Under certain other conditions (e.g., when the electro-optic device 110 is in a state preventing transmission of light), ambient light 190 is blocked by the electro-optic device 110 and does not reach eyebox 180.

Figure 2:
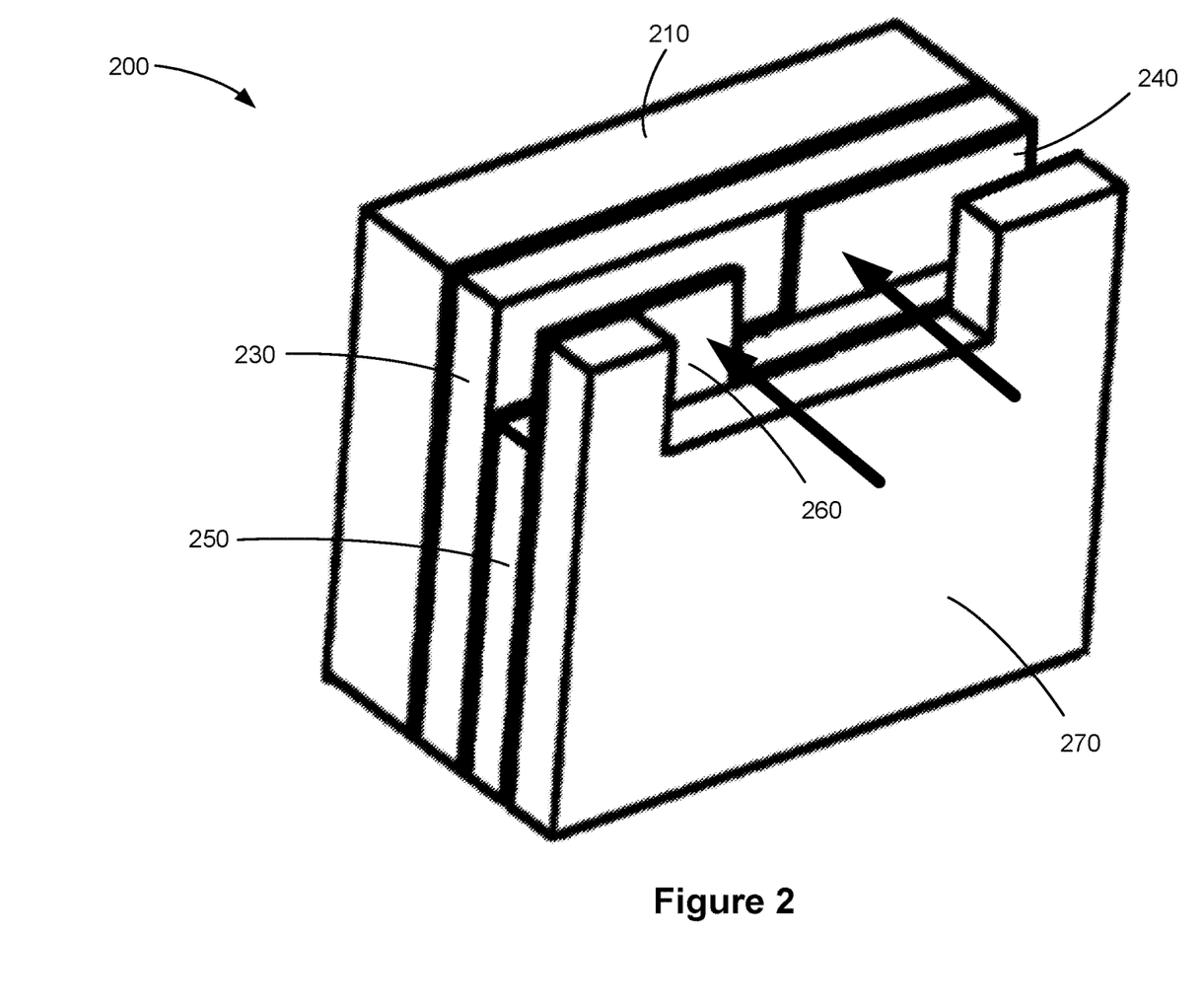
FIG. 2 is a schematic diagram illustrating an optical assembly in accordance with some embodiments.

FIG. 2 illustrates an optical assembly 200 in accordance with some embodiments. The optical assembly shown in FIG. 2 includes an active optical component (e.g., a dimming element consisting of elements 230, 240, 250, 260, and 270) coupled with a passive optical component 210 (e.g., a lens).

In some embodiments, the active optical component includes an activation layer 250 (e.g., a layer containing one or more electrooptic materials, such as liquid crystals, electrochromic materials, etc.) located between two electrodes (e.g., a first electrode 240 and a second electrode 260, which may be layers of indium tin oxide), as shown in FIG. 2.

In some embodiments, the activation layer includes one or more other materials. In some embodiments, the active optical component also includes one or more substrates (e.g., a first substrate labeled plastic 230 and a second substrate labeled plastic 270) for providing mechanical support for the two electrodes.

In some embodiments, the first electrode has a non-symmetric shape and the second electrode has a non-symmetric shape. In some embodiments, the shape of the first electrode does not match with the shape of the second electrode (e.g., the shape of the first electrode is distinct from the shape of the second electrode). In some embodiments, the shape of the first electrode is reflectively symmetric to the shape of the second electrode.

In some embodiments, the first electrode has a shape that exceeds the activation layer (e.g., the first electrode has a width greater than a width of the activation layer, a height greater than a height of the activation layer, or both) and the second electrode has a shape that exceeds the activation layer (e.g., the second electrode has a width greater than the width of the activation layer, a height greater than the height of the activation layer, or both). A portion of the first electrode that exceeds (or is not overlapped by) the activation layer is called a first overhang and a portion of the second electrode that exceeds (or is not overlapped by) the activation layer is called a second overhang. In some embodiments, the first overhang is offset from the second overhang in a direction perpendicular to a surface normal of the activation layer, a surface normal of the first electrode, or a surface normal of the second electrode. In some embodiments, the first overhang and the second overhang are positioned in the optical assembly in a way such that at least a portion of the first overhang and at least a portion of the second overhang are positioned away laterally.

In some embodiments, the first substrate has an opening. In some embodiments, the opening is located along an edge of the first substrate, as shown in FIG. 2. In some embodiments, the opening is located away from an edge of the first substrate (e.g., the opening is encircled by one or more portions of the first substrate). In some embodiments, the opening is positioned in the optical assembly in a way such that the opening is aligned with at least a portion of the first overhang and at least a portion of the second overhang. This allows electrical connectors (e.g., spring contacts) to be pressed onto the first overhang and the second overhang so that the electrical connectors form electrical coupling with the first electrode and the second electrode, respectively (e.g., a first electrical connector forms electrical coupling with the first electrode and a second electrical connector forms electrical coupling with the second electrode), as shown in FIG. 2.

Figure 3:
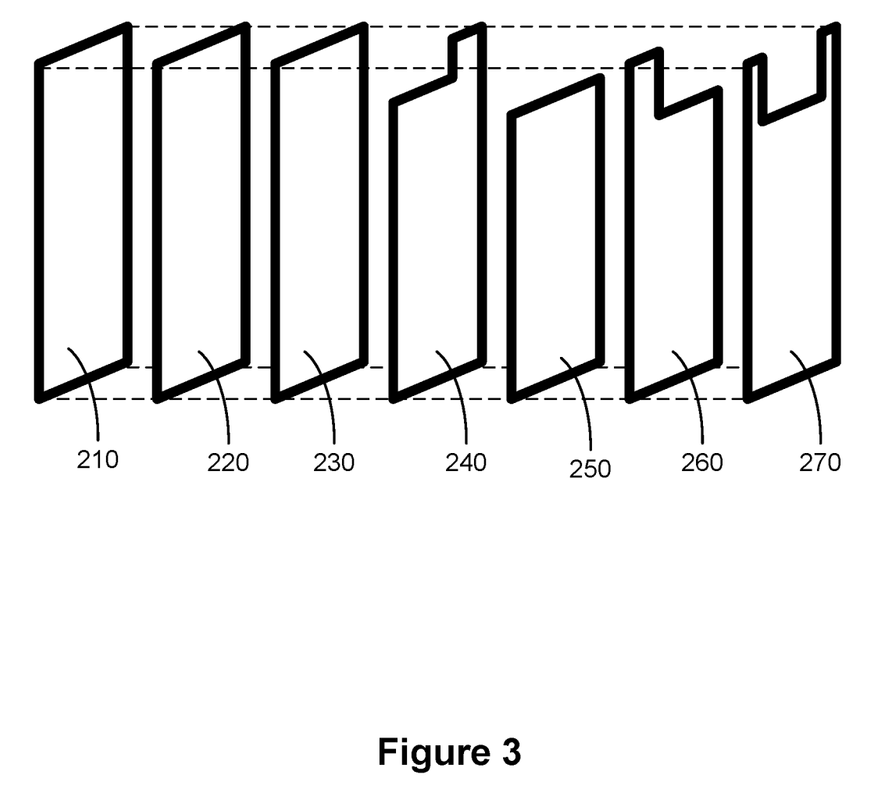
FIG. 3 is an exploded view of the optical assembly shown in FIG. 2.

FIG. 3 is an exploded view of the optical assembly shown in FIG. 2.

FIG. 3 also illustrates that, in some embodiments, the active optical component is coupled with the passive optical component using an adhesive 220 (e.g., an optically clear adhesive (OCA)). In some embodiments, the passive optical component has a non-flat surface (e.g., a convex surface or a concave surface), and the active optical component may also have one or more non-flat surfaces (e.g., in some embodiments, one or more of: the first substrate, the second substrate, the first electrode, the second electrode, or the activation layer have one or more non-flat surfaces, or are not flat (e.g., curved)).

Figure 4:
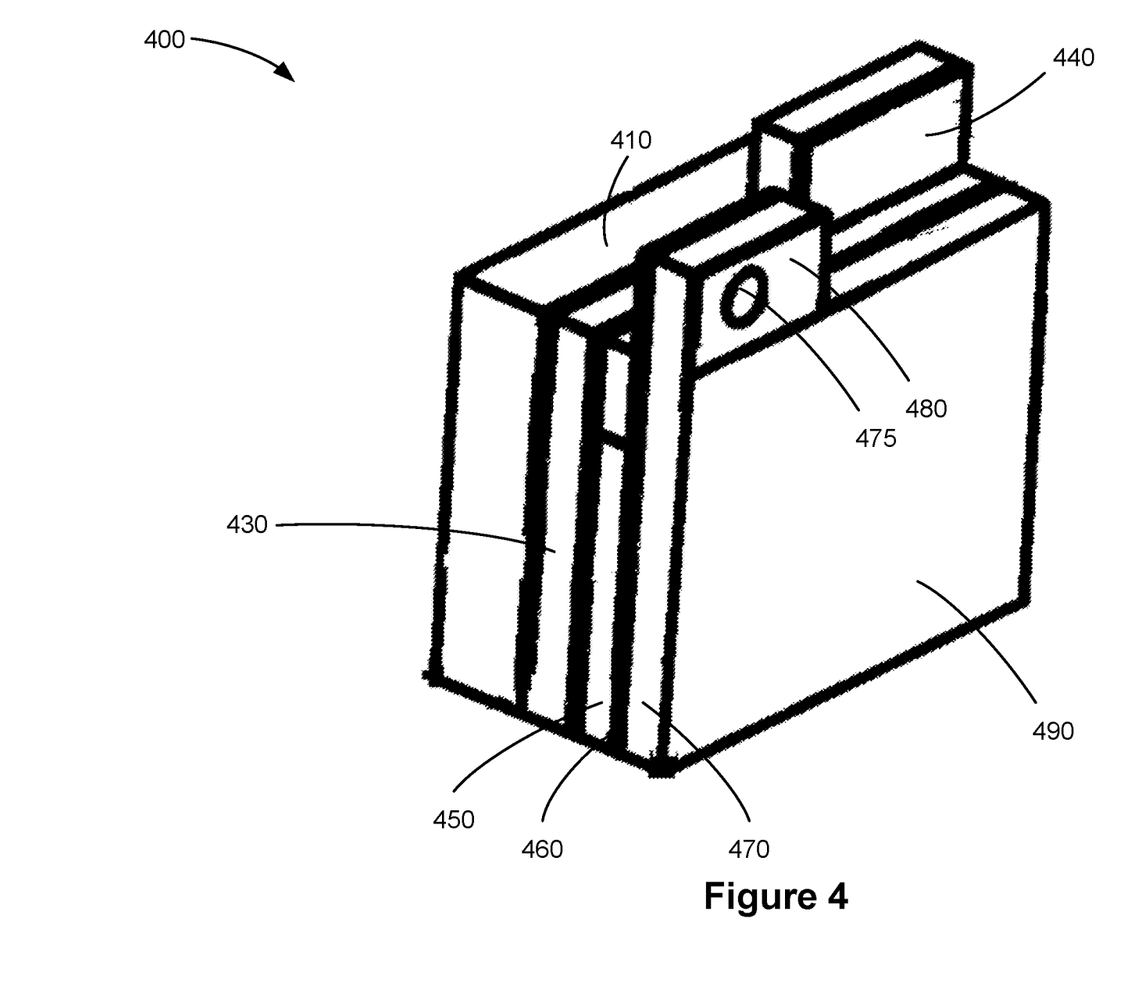
FIG. 4 is a schematic diagram illustrating an optical assembly in accordance with some embodiments.

FIG. 4 is a schematic diagram illustrating an optical assembly 400 in accordance with some embodiments. Similar to the optical assembly 200, the optical assembly 400 also includes a passive component 410, a first substrate 430, a first electrode 440, an active layer 450, a second electrode 460, and a second substrate 470.

In FIG. 4, a conductor (e.g., in a through-hole 475) extends through the second substrate 470 to the second electrode 460 from a side of the second substrate 470 opposite to the second electrode 460. Such conductor operates like a via. This allows one or more electrical connectors to be pressed onto the conductor, which is mechanically supported by the second substrate, instead of directly pressing on the second electrode.

In some embodiments, an optical assembly (e.g., 200 or 400) may be used in display devices such as head-mounted display devices. In some embodiments, an optical assembly (e.g., 200 or 400) may be implemented as multifunctional optical components in near-eye displays for augmented reality ("AR"), virtual reality ("VR"), and/or mixed reality ("MR"). For example, the disclosed optical elements or devices may be implemented as waveguide-based combiners, eye-tracking components, display resolution enhancement components, pupil steering elements, and polarization controlling components (e.g., a quarter-wave plate or a half-wave plate), etc., which may significantly reduce the weight and size, and enhance the optical performance of the head-mounted display devices. Exemplary embodiments of head-mounted display devices for implementing an optical assembly (e.g., 200 or 400) are described with respect to FIGS. 5-7.

Figure 5:
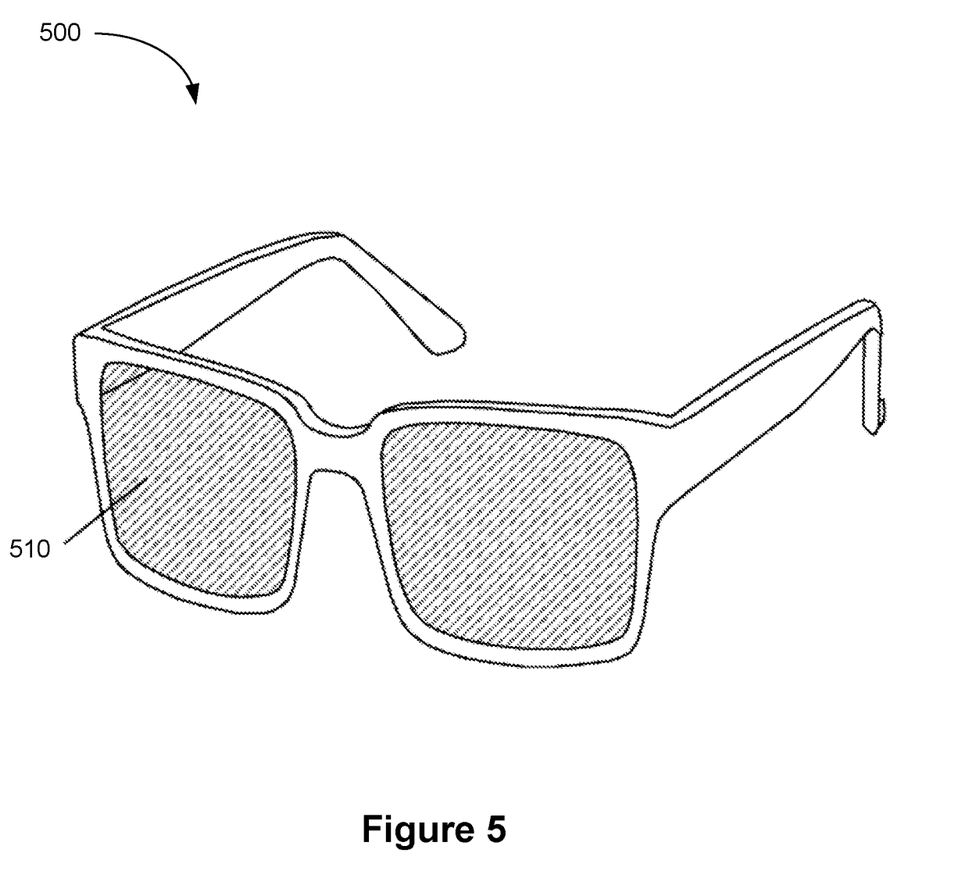
FIG. 5 is a perspective view of a display device in accordance with some embodiments.

FIG. 5 illustrates display device 500 in accordance with some embodiments. In some embodiments, display device 500 is configured to be worn on a head of a user (e.g., by having the form of spectacles or eyeglasses, as shown in FIG. 5) or to be included as part of a helmet that is to be worn by the user. When display device 500 is configured to be worn on a head of a user or to be included as part of a helmet, display device 500 is called a head-mounted display. Alternatively, display device 500 is configured for placement in proximity of an eye or eyes of the user at a fixed location, without being head-mounted (e.g., display device 500 is mounted in a vehicle, such as a car or an airplane, for placement in front of an eye or eyes of the user). As shown in FIG. 5, display device 500 includes display 510. Display 510 is configured for presenting visual contents (e.g., augmented reality contents, virtual reality contents, mixed reality contents, or any combination thereof) to a user.

Figure 6:
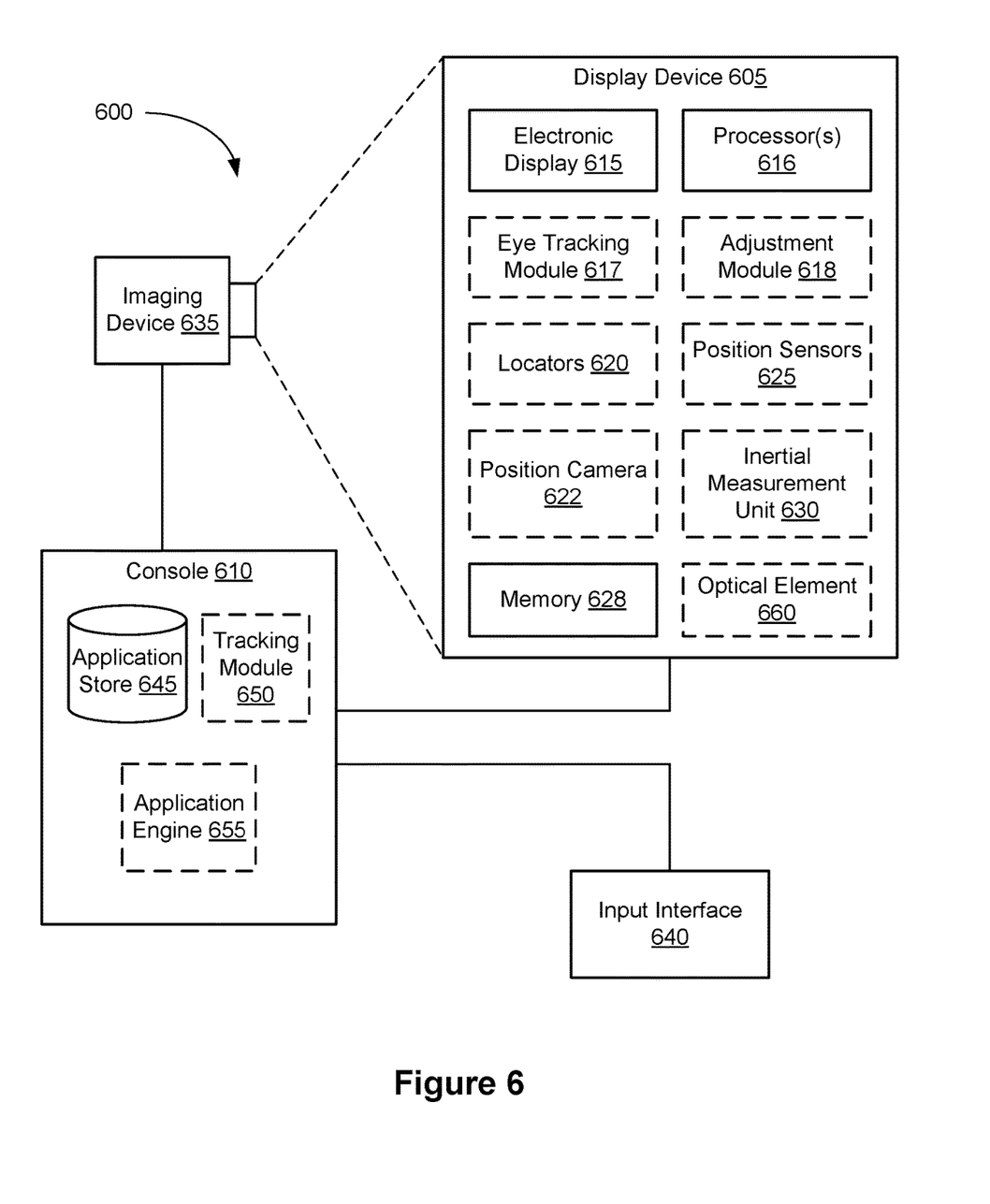
FIG. 6 is a block diagram of a system including a display device in accordance with some embodiments.

In some embodiments, display device 500 includes one or more components described herein with respect to FIG. 6. In some embodiments, display device 500 includes additional components not shown in FIG. 6.

FIG. 6 is a block diagram of system 600 in accordance with some embodiments. The system 600 shown in FIG. 6 includes display device 605 (which corresponds to display device 500 shown in FIG. 5), imaging device 635, and input interface 640 that are each coupled to console 610. While FIG. 6 shows an example of system 600 including one display device 605, imaging device 635, and input interface 640, in other embodiments, any number of these components may be included in system 600. For example, there may be multiple display devices 605 each having associated input interface 640 and being monitored by one or more imaging devices 635, with each display device 605, input interface 640, and imaging devices 635 communicating with console 610. In alternative configurations, different and/or additional components may be included in system 600. For example, in some embodiments, console 610 is connected via a network (e.g., the Internet or a wireless network) to system 600 or is self-contained as part of display device 605 (e.g., physically located inside display device 605). In some embodiments, display device 605 is used to create mixed reality by adding in a view of the real surroundings. Thus, display device 605 and system 600 described here can deliver augmented reality, virtual reality, and mixed reality.

In some embodiments, as shown in FIG. 5, display device 605 is a head-mounted display that presents media to a user. Examples of media presented by display device 605 include one or more images, video, audio, or some combination thereof. In some embodiments, audio is presented via an external device (e.g., speakers and/or headphones) that receives audio information from display device 605, console 610, or both, and presents audio data based on the audio information. In some embodiments, display device 605 immerses a user in an augmented environment.

In some embodiments, display device 605 also acts as an augmented reality (AR) headset. In these embodiments, display device 605 augments views of a physical, real-world environment with computer-generated elements (e.g., images, video, sound, etc.). Moreover, in some embodiments, display device 605 is able to cycle between different types of operation. Thus, display device 605 operate as a virtual reality (VR) device, an augmented reality (AR) device, as glasses or some combination thereof (e.g., glasses with no optical correction, glasses optically corrected for the user, sunglasses, or some combination thereof) based on instructions from application engine 655.

Display device 605 includes electronic display 615, one or more processors 616, eye tracking module 617, adjustment module 618, one or more locators 620, one or more position sensors 625, one or more position cameras 622, memory 628, inertial measurement unit (IMU) 630, one or more optical elements 660 or a subset or superset thereof (e.g., display device 605 with electronic display 615, one or more processors 616, and memory 628, without any other listed components). Some embodiments of display device 605 have different modules than those described here. Similarly, the functions can be distributed among the modules in a different manner than is described here.

One or more processors 616 (e.g., processing units or cores) execute instructions stored in memory 628. Memory 628 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 628, or alternately the non-volatile memory device(s) within memory 628, includes a non-transitory computer readable storage medium. In some embodiments, memory 628 or the computer readable storage medium of memory 628 stores programs, modules and data structures, and/or instructions for displaying one or more images on electronic display 615.

Electronic display 615 displays images to the user in accordance with data received from console 610 and/or processor(s) 616. In various embodiments, electronic display 615 may comprise a single adjustable display element or multiple adjustable display elements (e.g., a display for each eye of a user). In some embodiments, electronic display 615 is configured to display images to the user by projecting the images onto one or more optical elements 660.

In some embodiments, the display element includes one or more light emission devices and a corresponding array of spatial light modulators. A spatial light modulator is an array of electro-optic pixels, opto-electronic pixels, some other array of devices that dynamically adjust the amount of light transmitted by each device, or some combination thereof. These pixels are placed behind one or more lenses. In some embodiments, the spatial light modulator is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The spatial light modulator is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array. In some embodiments, electronic display 615 projects images to one or more reflective elements 660, which reflect at least a portion of the light toward an eye of a user.

One or more lenses direct light from the arrays of light emission devices (optionally through the emission intensity arrays) to locations within each eyebox and ultimately to the back of the user's retina(s). An eyebox is a region that is occupied by an eye of a user located proximity to display device 605 (e.g., a user wearing display device 605) for viewing images from display device 605. In some cases, the eyebox is represented as a 10 mm×10 mm square. In some embodiments, the one or more lenses include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed. As used herein, IR refers to light with wavelengths ranging from 700 nm to 1 mm including near infrared (NIR) ranging from 750 nm to 1500 nm.

Eye tracking module 617 determines locations of each pupil of a user's eyes. In some embodiments, eye tracking module 617 instructs electronic display 615 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is used to also determine location of the pupil. The IR detector array scans for retro-reflection and identifies which IR emission devices are active when retro-reflection is detected. Eye tracking module 617 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 617 maps the locations of the user's pupil while looking at the reference points to corresponding signals received on the IR tracking array). As mentioned above, in some embodiments, system 600 may use other eye tracking systems than the embedded IR one described herein.

Adjustment module 618 generates an image frame based on the determined locations of the pupils. In some embodiments, this sends a discrete image to the display that will tile subimages together thus a coherent stitched image will appear on the back of the retina. Adjustment module 618 adjusts an output (i.e. the generated image frame) of electronic display 615 based on the detected locations of the pupils. Adjustment module 618 instructs portions of electronic display 615 to pass image light to the determined locations of the pupils. In some embodiments, adjustment module 618 also instructs the electronic display to not pass image light to positions other than the determined locations of the pupils. Adjustment module 618 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 620 are objects located in specific positions on display device 605 relative to one another and relative to a specific reference point on display device 605. A locator 620 may be a light emitting diode (LED), a corner cube reflector, a reflective marker, a type of light source that contrasts with an environment in which display device 605 operates, or some combination thereof. In embodiments where locators 620 are active (e.g., an LED or other type of light emitting device), locators 620 may emit light in the visible band (e.g., about 500 nm to 750 nm), in the infrared band (e.g., about 750 nm to 1 mm), in the ultraviolet band (about 100 nm to 500 nm), some other portion of the electromagnetic spectrum, or some combination thereof.

In some embodiments, locators 620 are located beneath an outer surface of display device 605, which is transparent to the wavelengths of light emitted or reflected by locators 620 or is thin enough to not substantially attenuate the wavelengths of light emitted or reflected by locators 620. Additionally, in some embodiments, the outer surface or other portions of display device 605 are opaque in the visible band of wavelengths of light. Thus, locators 620 may emit light in the IR band under an outer surface that is transparent in the IR band but opaque in the visible band.

IMU 630 is an electronic device that generates calibration data based on measurement signals received from one or more position sensors 625. Position sensor 625 generates one or more measurement signals in response to motion of display device 605. Examples of position sensors 625 include: one or more accelerometers, one or more gyroscopes, one or more magnetometers, another suitable type of sensor that detects motion, a type of sensor used for error correction of IMU 630, or some combination thereof. Position sensors 625 may be located external to IMU 630, internal to IMU 630, or some combination thereof.

Based on the one or more measurement signals from one or more position sensors 625, IMU 630 generates first calibration data indicating an estimated position of display device 605 relative to an initial position of display device 605. For example, position sensors 625 include multiple accelerometers to measure translational motion (forward/back, up/down, left/right) and multiple gyroscopes to measure rotational motion (e.g., pitch, yaw, roll). In some embodiments, IMU 630 rapidly samples the measurement signals and calculates the estimated position of display device 605 from the sampled data. For example, IMU 630 integrates the measurement signals received from the accelerometers over time to estimate a velocity vector and integrates the velocity vector over time to determine an estimated position of a reference point on display device 605. Alternatively, IMU 630 provides the sampled measurement signals to console 610, which determines the first calibration data. The reference point is a point that may be used to describe the position of display device 605. While the reference point may generally be defined as a point in space; however, in practice the reference point is defined as a point within display device 605 (e.g., a center of IMU 630).

In some embodiments, IMU 630 receives one or more calibration parameters from console 610. As further discussed below, the one or more calibration parameters are used to maintain tracking of display device 605. Based on a received calibration parameter, IMU 630 may adjust one or more IMU parameters (e.g., sample rate). In some embodiments, certain calibration parameters cause IMU 630 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 635 generates calibration data in accordance with calibration parameters received from console 610. Calibration data includes one or more images showing observed positions of locators 620 that are detectable by imaging device 635. In some embodiments, imaging device 635 includes one or more still cameras, one or more video cameras, any other device capable of capturing images including one or more locators 620, or some combination thereof. Additionally, imaging device 635 may include one or more filters (e.g., used to increase signal to noise ratio). Imaging device 635 is configured to optionally detect light emitted or reflected from locators 620 in a field of view of imaging device 635. In embodiments where locators 620 include passive elements (e.g., a retroreflector), imaging device 635 may include a light source that illuminates some or all of locators 620, which retro-reflect the light towards the light source in imaging device 635. Second calibration data is communicated from imaging device 635 to console 610, and imaging device 635 receives one or more calibration parameters from console 610 to adjust one or more imaging parameters (e.g., focal length, focus, frame rate, ISO, sensor temperature, shutter speed, aperture, etc.).

In some embodiments, display device 605 optionally includes one or more optical elements 660 (e.g., lenses, reflectors, gratings, etc.). In some embodiments, electronic display device 605 includes a single optical element 660 or multiple optical elements 660 (e.g., an optical element 660 for each eye of a user). In some embodiments, electronic display 615 projects computer-generated images on one or more optical elements 660, such as a reflective element, which, in turn, reflect the images toward an eye or eyes of a user. The computer-generated images include still images, animated images, and/or a combination thereof. The computer-generated images include objects that appear to be two-dimensional and/or three-dimensional objects. In some embodiments, one or more optical elements 660 are partially transparent (e.g., the one or more optical elements 660 have a transmittance of at least 15%, 20%, 25%, 30%, 35%, 50%, 55%, or 50%), which allows transmission of ambient light. In such embodiments, computer-generated images projected by electronic display 615 are superimposed with the transmitted ambient light (e.g., transmitted ambient image) to provide augmented reality images. In some embodiments, optical elements 660 include an optical assembly (e.g., 200 or 400) described above with respect to FIGS. 2-4.

Input interface 640 is a device that allows a user to send action requests to console 610. An action request is a request to perform a particular action. For example, an action request may be to start or end an application or to perform a particular action within the application. Input interface 640 may include one or more input devices. Example input devices include: a keyboard, a mouse, a game controller, data from brain signals, data from other parts of the human body, or any other suitable device for receiving action requests and communicating the received action requests to console 610. An action request received by input interface 640 is communicated to console 610, which performs an action corresponding to the action request. In some embodiments, input interface 640 may provide haptic feedback to the user in accordance with instructions received from console 610. For example, haptic feedback is provided when an action request is received, or console 610 communicates instructions to input interface 640 causing input interface 640 to generate haptic feedback when console 610 performs an action.

Console 610 provides media to display device 605 for presentation to the user in accordance with information received from one or more of: imaging device 635, display device 605, and input interface 640. In the example shown in FIG. 6, console 610 includes application store 645, tracking module 650, and application engine 655. Some embodiments of console 610 have different modules than those described in conjunction with FIG. 6. Similarly, the functions further described herein may be distributed among components of console 610 in a different manner than is described here.

When application store 645 is included in console 610, application store 645 stores one or more applications for execution by console 610. An application is a group of instructions, that when executed by a processor, is used for generating content for presentation to the user. Content generated by the processor based on an application may be in response to inputs received from the user via movement of display device 605 or input interface 640. Examples of applications include: gaming applications, conferencing applications, video playback application, or other suitable applications.

When tracking module 650 is included in console 610, tracking module 650 calibrates system 600 using one or more calibration parameters and may adjust one or more calibration parameters to reduce error in determination of the position of display device 605. For example, tracking module 650 adjusts the focus of imaging device 635 to obtain a more accurate position for observed locators on display device 605. Moreover, calibration performed by tracking module 650 also accounts for information received from IMU 630. Additionally, if tracking of display device 605 is lost (e.g., imaging device 635 loses line of sight of at least a threshold number of locators 620), tracking module 650 re-calibrates some or all of system 600.

In some embodiments, tracking module 650 tracks movements of display device 605 using second calibration data from imaging device 635. For example, tracking module 650 determines positions of a reference point of display device 605 using observed locators from the second calibration data and a model of display device 605. In some embodiments, tracking module 650 also determines positions of a reference point of display device 605 using position information from the first calibration data. Additionally, in some embodiments, tracking module 650 may use portions of the first calibration data, the second calibration data, or some combination thereof, to predict a future location of display device 605. Tracking module 650 provides the estimated or predicted future position of display device 605 to application engine 655.

Application engine 655 executes applications within system 600 and receives position information, acceleration information, velocity information, predicted future positions, or some combination thereof of display device 605 from tracking module 650. Based on the received information, application engine 655 determines content to provide to display device 605 for presentation to the user. For example, if the received information indicates that the user has looked to the left, application engine 655 generates content for display device 605 that mirrors the user's movement in an augmented environment. Additionally, application engine 655 performs an action within an application executing on console 610 in response to an action request received from input interface 640 and provides feedback to the user that the action was performed. The provided feedback may be visual or audible feedback via display device 605 or haptic feedback via input interface 640.

Figure 7:
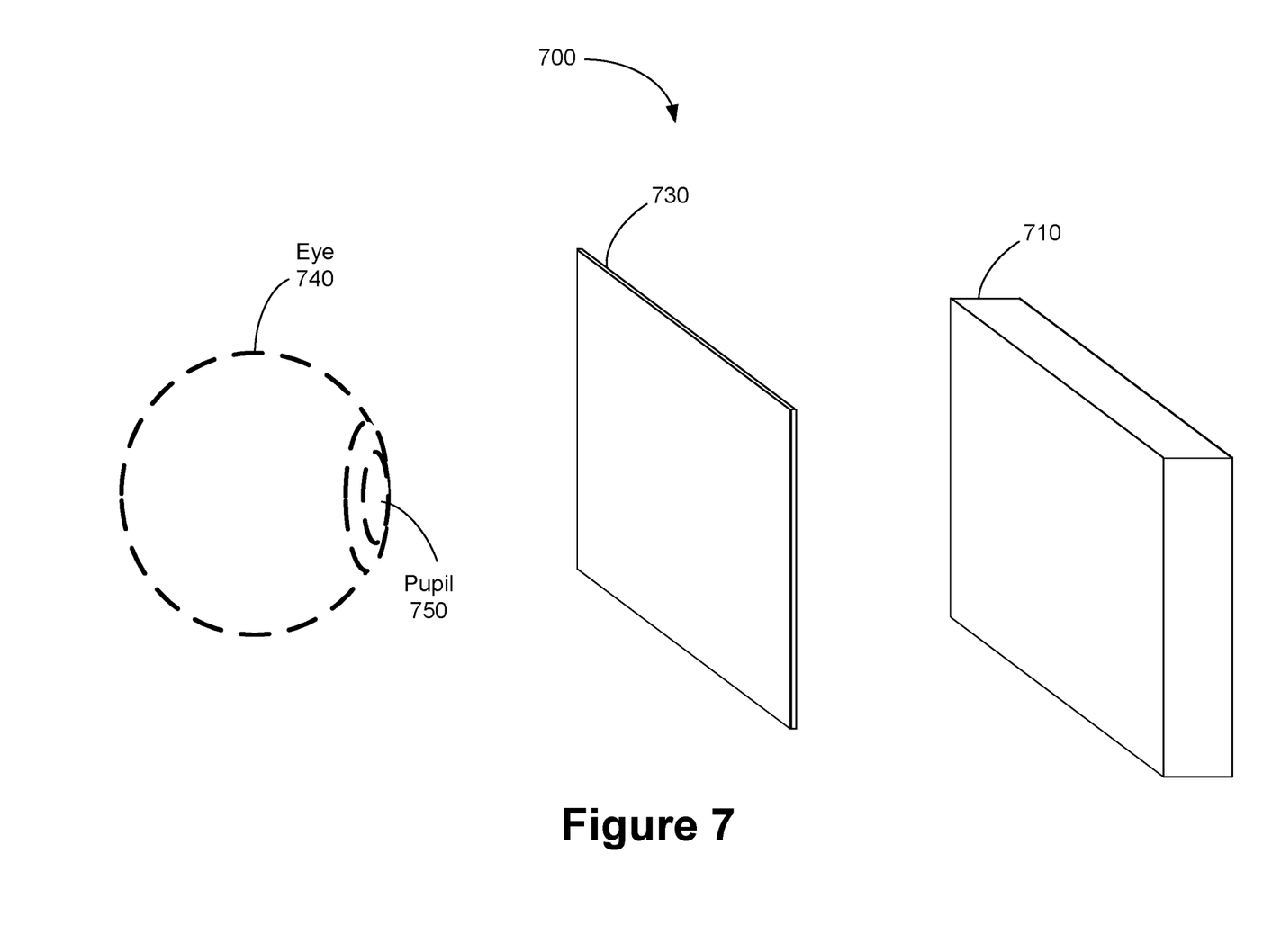
FIG. 7 is an isometric view of a display device in accordance with some embodiments.

FIG. 7 is an isometric view of display device 700 in accordance with some embodiments. In some other embodiments, display device 700 is part of some other electronic display (e.g., a digital microscope, a head-mounted display device, etc.). In some embodiments, display device 700 includes light emission device 710 (e.g., a light emission device array) and an optical assembly 730, which may include one or more lenses and/or other optical components. In some embodiments, display device 700 also includes an IR detector array.

Light emission device 710 emits image light and optional IR light toward the viewing user. Light emission device 710 includes one or more light emission components that emit light in the visible light (and optionally includes components that emit light in the IR). Light emission device 710 may include, e.g., an array of LEDs, an array of microLEDs, an array of organic LEDs (OLEDs), an array of superluminescent LEDs (sLEDS) or some combination thereof.

In some embodiments, light emission device 710 includes an emission intensity array (e.g., a spatial light modulator) configured to selectively attenuate light emitted from light emission device 710. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner, the emission intensity array is able to provide image light and/or control what portion of the image light is passed to the optical assembly 730. In some embodiments, display device 700 uses the emission intensity array to facilitate providing image light to a location of pupil 750 of eye 740 of a user, and minimize the amount of image light provided to other areas in the eyebox. In some embodiments, display device 700 includes, or is optically coupled with, electro-optic devices operating as a display resolution enhancement component. In some embodiments, display device 700 is an augmented reality display device. In such embodiments, display device 700 includes, or is optically coupled with, electro-optic devices operating as a waveguide-based combiner or as a polarization selective reflector.

The optical assembly 730 includes one or more lenses. The one or more lenses in optical assembly 730 receive modified image light (e.g., attenuated light) from light emission device 710, and direct the modified image light to a location of pupil 750. The optical assembly 730 may include additional optical components, such as color filters, mirrors, etc. In some embodiments, the optical assembly 730 includes an optical assembly (e.g., 200 or 400) described above with respect to FIGS. 2-4.

An optional IR detector array detects IR light that has been retro-reflected from the retina of eye 740, a cornea of eye 740, a crystalline lens of eye 740, or some combination thereof. The IR detector array includes either a single IR sensor or a plurality of IR sensitive detectors (e.g., photodiodes). In some embodiments, the IR detector array is separate from light emission device 710. In some embodiments, the IR detector array is integrated into light emission device 710.

In some embodiments, light emission device 710 including an emission intensity array make up a display element. Alternatively, the display element includes light emission device 710 (e.g., when light emission device 710 includes individually adjustable pixels) without the emission intensity array. In some embodiments, the display element additionally includes the IR array. In some embodiments, in response to a determined location of pupil 750, the display element adjusts the emitted image light such that the light output by the display element is refracted by one or more lenses toward the determined location of pupil 750, and not toward other locations in the eyebox.

In some embodiments, display device 700 includes one or more broadband sources (e.g., one or more white LEDs) coupled with a plurality of color filters, in addition to, or instead of, light emission device 710.

In light of these principles, we now turn to certain embodiments.

In accordance with some embodiments, an optical assembly includes an active optical component. The active optical component includes an activation layer located between two electrodes, and one or more substrates for providing mechanical support for at least one of the two electrodes.

In some embodiments, the two electrodes include a first electrode and a second electrode distinct and separate from the first electrode.

In some embodiments, the first electrode has a non-symmetric shape and the second electrode has a non-symmetric shape.

In some embodiments, the shape of the first electrode does not match the shape of the second electrode.

In some embodiments, the shape of the first electrode is reflectively symmetric to the shape of the second electrode.

In some embodiments, the first electrode has a shape that exceeds the activation layer and the second electrode has a shape that exceeds the activation layer.

In some embodiments, the first electrode has a height greater than a height of the activation layer and the second electrode has a height greater than the height of the activation layer.

In some embodiments, the optical assembly includes at least one of: (i) a first substrate for providing mechanical support for the first electrode; or (ii) a second substrate for providing mechanical support for the second electrode.

In some embodiments, at least one of the following conditions is satisfied: (i) the first substrate has a height that corresponds to a height of the first electrode; or (ii) the second substrate has a height that corresponds to a height of the second electrode.

In some embodiments, at least one of the following conditions is satisfied: (i) the first electrode includes a first portion having a first width and a second portion that extends from the first portion of the first electrode and has a second width less than the first width; or (ii) the second electrode includes a first portion having a third width and a second portion that extends from the first portion of the second electrode and has a fourth width less than the third width.

In some embodiments, the second substrate includes a first portion having a fifth width and a second portion that extends from the first portion of the second substrate and has a sixth width less than the fifth width.

In some embodiments, the sixth width is less than the fourth width.

In some embodiments, the sixth width corresponds to the fourth width.

In some embodiments, a through-hole is defined in the second portion of the second substrate. The second substrate has a first surface and a second surface opposite to the first surface. The first surface of the second substrate is in contact with the second electrode. The second surface of the second substrate is in contact with a conductive layer. The second electrode is electrically coupled with the conductive layer through conductive material located in the through-hole.

In some embodiments, the second substrate includes a third portion that extends from the first portion of the second substrate, is separate from the second portion of the second substrate, and has a seventh width less than the fifth width.

In some embodiments, the second portion of the second substrate and the third portion of the second substrate extend from a common edge of the first portion of the second substrate.

In some embodiments, the first substrate includes a first portion having an eighth width and a second portion that extends from the first portion of the first substrate and has a ninth width less than the eighth width.

In some embodiments, the ninth width corresponds to the second width.

In some embodiments, the first substrate has a tenth width that corresponds to the first width.

In some embodiments, the optical assembly further includes a passive optical component coupled with the active optical component.

As used herein, the terms "couple," "coupled," "coupling," or the like may encompass an optical coupling, a mechanical coupling, an electrical coupling, an electromagnetic coupling, or a combination thereof. An "optical coupling" between two optical devices refers to a configuration in which the two optical devices are arranged in an optical series, and a light output from one optical device may be directly or indirectly received by the other optical device. An optical series refers to optical positioning of a plurality of optical devices in a light path, such that a light output from one optical device may be transmitted, reflected, diffracted, converted, modified, or otherwise processed or manipulated by one or more of other optical devices. In some embodiments, the sequence in which the plurality of optical devices are arranged may or may not affect an overall output of the plurality of optical devices. A coupling may be a direct coupling or an indirect coupling (e.g., coupling through an intermediate element).

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example.

Furthermore, the phrase "at least one of A or B" may encompass all combinations of A and B, such as A only, B only, A and B, or AA, BB, AAB, ABB, AABB, etc. Likewise, the phrase "at least one of A, B, or C" may encompass all combinations of A, B, and C, such as A only, B only, C only, A and B, A and C, B and C, A and B and C, AA, BB, CC, AAB, AAC, ABB, ACC, BBC, BCC, AAA, BBB, CCC, AABB, AACC, BBCC, AABBCC, etc. The phrase "A and/or B" has a meaning similar to that of the phrase "at least one of A or B." For example, the phrase "A and/or B" may encompass all combinations of A and B, such as A only, B only, or A and B. Likewise, the phrase "A, B, and/or C" has a meaning similar to that of the phrase "at least one of A, B, or C." For example, the phrase "A, B, and/or C" may encompass all combinations of A, B, and C, such as A only, B only, C only, A and B, A and C, B and C, A and B and C.

When a first element is described as "attached," "provided," "formed," "affixed," "mounted," "secured," "connected," "bonded," "recorded," or "disposed," to, on, at, or at least partially in a second element, the first element may be "attached," "provided," "formed," "affixed," "mounted," "secured," "connected," "bonded," "recorded," or "disposed," to, on, at, or at least partially in the second element using any suitable mechanical or non-mechanical manner, such as depositing, coating, etching, bonding, gluing, screwing, press-fitting, snap-fitting, clamping, etc. In addition, the first element may be in direct contact with the second element, or there may be an intermediate element between the first element and the second element. The first element may be disposed at any suitable side of the second element, such as left, right, front, back, top, or bottom.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Although various drawings illustrate operations of particular components or particular groups of components with respect to one eye, a person having ordinary skill in the art would understand that analogous operations can be performed with respect to the other eye or both eyes. For brevity, such details are not repeated herein.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. An optical assembly, comprising:
   an active optical component including:
      an activation layer located between two electrodes; and
      one or more substrates for providing mechanical support for at least one of the two electrodes, wherein:
      the two electrodes include a first electrode and a second electrode distinct and separate from the first electrode;
      the optical assembly includes at least one of:
         a first substrate for providing mechanical support for the first electrode; or
         a second substrate for providing mechanical support for the second electrode;
      at least one of the following conditions is satisfied:
         the first electrode includes a first portion having a first width and a second portion that extends from the first portion of the first electrode and has a second width less than the first width; or
         the second electrode includes a first portion having a third width and a second portion that extends from the first portion of the second electrode and has a fourth width less than the third width; and
      the second substrate includes a first portion having a fifth width and a second portion that extends from the first portion of the second substrate and has a sixth width less than the fifth width.

2. The optical assembly of claim 1, wherein the first electrode has a non-symmetric shape and the second electrode has a non-symmetric shape.

3. The optical assembly of claim 1, wherein the shape of the first electrode does not match the shape of the second electrode.

4. The optical assembly of claim 1, wherein the shape of the first electrode is reflectively symmetric to the shape of the second electrode.

5. The optical assembly of claim 1, wherein the first electrode has a shape that exceeds the activation layer and the second electrode has a shape that exceeds the activation layer.

6. The optical assembly of claim 1, wherein the first electrode defines a first planar direction parallel to the first width and a second planar direction perpendicular to the first planar direction, the first electrode has a height, parallel to the second planar direction, greater than a height of the activation layer parallel to the second planar direction, and the second electrode has a height, parallel to the second planar direction, greater than the height of the activation layer parallel to the second planar direction.

7. The optical assembly of claim 1, wherein the first electrode defines a first planar direction parallel to the first width and a second planar direction perpendicular to the first planar direction, and at least one of the following conditions is satisfied:
   the first substrate has a height, parallel to the second planar direction, that corresponds to a height of the first electrode parallel to the second planar direction; or
   the second substrate has a height, parallel to the second planar direction, that corresponds to a height of the second electrode parallel to the second planar direction.

8. The optical assembly of claim 1, wherein:
   the sixth width is less than the fourth width.

9. The optical assembly of claim 1, wherein:
   the sixth width corresponds to the fourth width.

10. The optical assembly of claim 9, wherein:
    a through-hole is defined in the second portion of the second substrate;
    the second substrate has a first surface and a second surface opposite to the first surface;
    the first surface of the second substrate is in contact with the second electrode;
    the second surface of the second substrate is in contact with a conductive layer; and
    the second electrode is electrically coupled with the conductive layer through conductive material located in the through-hole.

11. The optical assembly of claim 1, wherein:
    the second substrate includes a third portion that extends from the first portion of the second substrate, is separate from the second portion of the second substrate, and has a seventh width less than the fifth width.

12. The optical assembly of claim 11, wherein:
    the second portion of the second substrate and the third portion of the second substrate extend from a common edge of the first portion of the second substrate.

13. The optical assembly of claim 1, wherein:
    the first substrate has a tenth width that corresponds to the first width.

14. The optical assembly of claim 1, further comprising a passive optical component coupled with the active optical component.

15. An optical assembly, comprising:
an active optical component including:
- an activation layer located between two electrodes; and
- one or more substrates for providing mechanical support for at least one of the two electrodes, wherein:
  - the two electrodes include a first electrode and a second electrode distinct and separate from the first electrode;
  - the optical assembly includes at least one of:
    - a first substrate for providing mechanical support for the first electrode; or
    - a second substrate for providing mechanical support for the second electrode;
  - at least one of the following conditions is satisfied:
    - the first electrode includes a first portion having a first width and a second portion that extends from the first portion of the first electrode and has a second width less than the first width; or
    - the second electrode includes a first portion having a third width and a second portion that extends from the first portion of the second electrode and has a fourth width less than the third width; and the first substrate includes a first portion having an eighth width and a second portion that extends from the first portion of the first substrate and has a ninth width less than the eighth width.

16. The optical assembly of claim 15, wherein:
the nineth width corresponds to the second width.

17. The optical assembly of claim 15, further comprising a passive optical component coupled with the active optical component.

* * * * *